United States Patent
Xu

(10) Patent No.: US 10,333,585 B1
(45) Date of Patent: Jun. 25, 2019

(54) REPEATER DEVICE WITH A PLURALITY OF PARAMETER CONFIGURATION MODES AND PARAMETER CONFIGURATION METHOD THEREOF

(71) Applicants: INVENTEC (PUDONG) TECHNOLOGY CORPORATION, Shanghai (CN); INVENTEC CORPORATION, Taipei (TW)

(72) Inventor: Ji-Wei Xu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/142,211

(22) Filed: Sep. 26, 2018

(30) Foreign Application Priority Data

Sep. 17, 2018 (CN) .......................... 2018 1 10811256

(51) Int. Cl.
*H04B 3/36* (2006.01)

(52) U.S. Cl.
CPC ...................... *H04B 3/36* (2013.01)

(58) Field of Classification Search
CPC ....................................................... H04B 3/36
See application file for complete search history.

(56) References Cited

U.S. PATENT DOCUMENTS

| 5,875,210 A | * | 2/1999 | Brief | .......... | H04B 3/36 |
| | | | | | 370/226 |
| 6,956,826 B1 | * | 10/2005 | Binder | .................... | H04L 12/40 |
| | | | | | 370/254 |
| 8,085,667 B2 | * | 12/2011 | Yamaguchi | ........ | H04B 7/15542 |
| | | | | | 370/235 |
| 2016/0182123 A1 | * | 6/2016 | Kao | ........................ | H04N 21/60 |
| | | | | | 375/214 |

* cited by examiner

*Primary Examiner* — Dac V Ha
(74) *Attorney, Agent, or Firm* — Maschoff Brennan

(57) ABSTRACT

A repeater device is with a plurality of parameter configuration modes for connecting a memory and a controller, and the repeater device comprises the following figures. A signal repeater is configured to connect to the memory and the controller respectively, and the signal repeater is adapted to acquire a preset parameter data for setting an internal parameter data, and generating a switch signal after the internal parameter data is completed setting. A switch device electrically connects to the signal repeater, wherein the switch device is adapted to conduct a data transmission path between the signal repeater and the controller based on the switch signal. The signal repeater resets the internal parameter data when receives a target parameter data by the data transmission path between the signal repeater and the controller.

10 Claims, 1 Drawing Sheet

REPEATER DEVICE WITH A PLURALITY OF PARAMETER CONFIGURATION MODES AND PARAMETER CONFIGURATION METHOD THEREOF

CROSS-REFERENCE TO RELATED APPLICATIONS

This non-provisional application claims priority under 35 U.S.C. § 119(a) on Patent Application No(s). 201811081125.6 filed in China on Sep. 17, 2018, the entire contents of which are hereby incorporated by reference.

TECHNICAL FIELD

The disclosure relates to a repeater device, more particularly to the repeater device with a plurality of parameter configuration modes.

BACKGROUND

The repeater is a device configured to gain the input signal. Normally, when the electrical signal is sent by the cable, the signal power is decreased as the length of the cable is increased. Hence, it needs a repeater for gaining the signal power so as to improve the transmitting distance of the signal. As the technology and the demand of the communication system for the users are both kept growing, the system structure becomes more and more complex, and the length of the cable is getting longer, too. As a result, the requirement of the repeater is increased.

However, the parameter configuration in the repeater is set by the pin mode which comprising four input states. Thus, there is limitation of the parameter configuration which is able to be disposed, and the state is probability switched to the adjacent states due to the outside interference. Furthermore, when the length of cable adapted to the repeater is changed, the parameter is not able to be change currently. Therefore, it needs to change the printed circuit board to adjust above situation.

SUMMARY

A repeater device is with a plurality of parameter configuration modes for connecting a memory and a controller, and said device comprises the following figures. A signal repeater is configured to connect to the memory and the controller respectively, with the signal repeater is adapted to acquire preset parameter data from the memory for setting internal parameter data, and the signal repeater generates a switch signal after a setting of the internal parameter data is completed. A switch device which is electrically connected to the signal repeater, wherein the switch device is adapted to conduct a data transmission path between the signal repeater and the controller based on the switch signal. Additionally, the signal repeater resets the internal parameter data when the signal repeater receives target parameter data by the data transmission path between the signal repeater and the controller.

A parameter configuration method is disclosed in this disclosure, and the method comprises: setting internal parameter data of a signal repeater based on preset parameter data in a memory by the signal repeater, and sending a switch signal to a switch device for conducting a data transmission path between the signal repeater and a controller after the signal repeater is completed setting the internal parameter data; also, determining whether the internal parameter data conforms to target parameter data when the controller acquires the internal parameter data by the data transmission path, and resetting the internal parameter data of the signal repeater based on the target parameter data by the controller thorough the data transmission path when the internal parameter data not conforms to the target parameter data.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
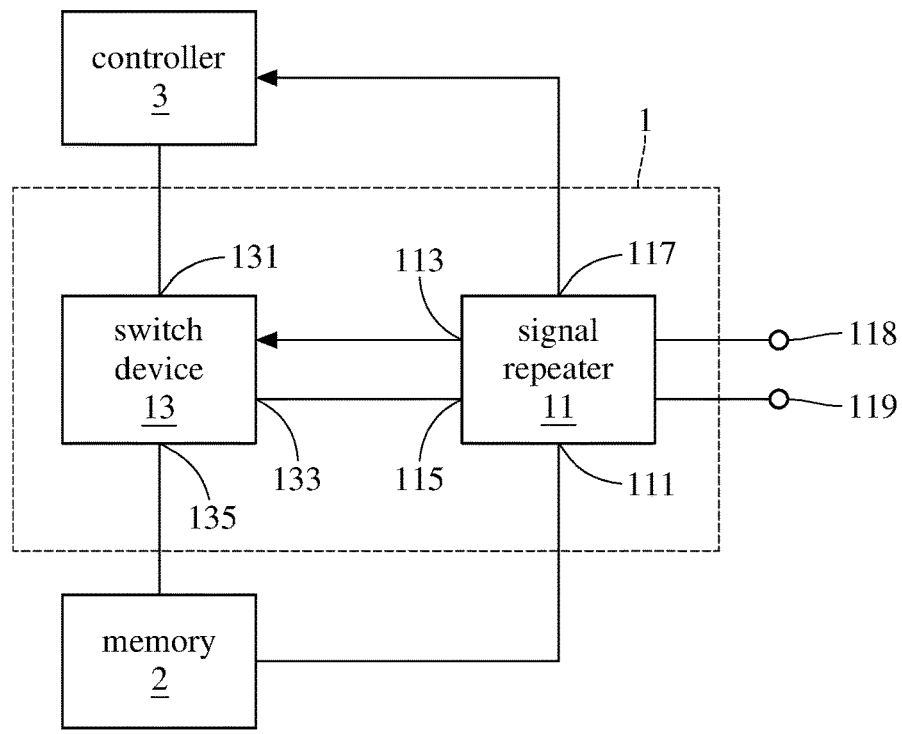
FIG. 1 is the diagram of the repeater device with a plurality of parameter configuration modes in an embodiment based on this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, wherein FIG. 1 is the diagram of the repeater device 1 with a plurality of parameter configuration modes in an embodiment based on this disclosure. As FIG. 1 shows, the repeater device 1 comprises a signal repeater 11 and a switch device 13, wherein the repeater device 1 is for connecting a memory 2 and a controller 3. Additionally, the memory 2 may be an EEPROM (electrically-erasable programmable read-only memory) or other kinds of non-volatile memory, the controller 3 may be a BMC (baseboard management controller) or other kinds of controller, wherein this disclosure is not limited by the above examples. In this embodiment, the data transmitting relation between the repeater device 1 and the controller 3 is changed by controlling the switch of the switch device 13, so the signal repeater 11 is switched between a plurality of parameter configuration modes. Specifically, said a plurality of parameter configuration modes comprise a major mode and a minor mode. In the major mode, the signal repeater 11 change the internal parameter data voluntarily. In the minor mode, the internal parameter data of the signal repeater 11 is changed by an external device (such as the controller 3). The detailed process is described in the following sections.

In this embodiment, the signal repeater 11 of the repeater device 1 is electrically connected to the switch device 13. In addition, the signal repeater 11 may be a repeater IC, wherein the signal repeater 11 is adapted to receive the external signal by a cable and gains the external signal based on the internal parameter data. As FIG. 1 shows, the signal repeater 11 is configured to connect to the memory 2 for acquiring preset parameter data, and the signal repeater 11 sets the internal parameter data based on the preset parameter data. Furthermore, said internal parameter data is able to be saved in a register of the signal repeater 11. Particularly, the signal repeater 11 is configured to connect to the memory 2 by a first data port 111, the first data port 111 loads the preset parameter data saved in the memory 2 when the signal repeater 11 is in the major mode, and the signal repeater 11 sets the internal parameter data based on the loaded preset parameter data. In addition, the circuit connected the signal repeater 11 and the memory 2 by the first data port 111 may be an I2C bus (inter-integrated circuit bus).

After the setting of the internal parameter data is completed, the signal repeater 11 generates a switch signal and sends the switch signal to a switch device 13. The switch device 13 may be a switch diode, a MOSFET (metal-oxide-semiconductor field-effect transistor) or other kinds of switch element or circuit, and this disclosure is not limited by the above examples. When the switch device 13 receives the switch signal generated by the signal repeater 11, the switch device 13 conducts a data transmission path between the signal repeater 11 based on the switch signal. Particularly, the signal repeater 11 sends a control signal to the switch device 13 by a first control signal sending port 113 for conducting the switch device 13. Hence, the controller 3 is able to control the internal parameter data of the signal repeater 11 by the circuit between the first data port 131 and the switch device 13, and the circuit between the second data port 133, the switch device 13 and the signal repeater 11. The two circuits are said above data transmission paths between the signal repeater 11 and the controller 3, and the data transmission paths may be an I2C bus (inter-integrated circuit bus). Furthermore, the signal repeater 11 is in the minor mode in this condition, and when the signal repeater 11 receives target parameter data by the data transmission path between the controller 3 and the signal repeater 11, the signal repeater 11 resets the internal parameter data based on the target parameter data.

The repeater device 1 switches the signal repeater 11 between the major mode and the minor mode by controlling the switch device 13. When the signal repeater 11 is in the major mode, the signal repeater 11 is able to acquire the parameter data from the memory 2. On the other hand, when the signal repeater 11 is in the minor mode, the parameter data of the signal repeater 11 is reset passively by the controller 3, wherein the detailed method about the controller 3 resetting the internal parameter data of the signal repeater 11 is described in the following description. In an embodiment, the signal repeater 11 not only sends the switch signal to the switch device 13 for switching the mode from the major mode to the minor mode, and the signal repeater 11 further sends a state signal to the controller 3 by a second control signal sending port 117 for prompting the controller 3 able to control the parameter configuration of the signal repeater 11. Additionally, the state signal indicates the current operation mode of the signal repeater 11, and the current operation mode is related to said above switch signal. For example, the signal repeater 11 is able to input the state signal to a logic gate, and the switch signal is generated by the calculation of the logic gate.

In another embodiment, the switch device 13 of the repeater device 1 further sends the target parameter data of the controller 3 to the memory 2 based on the switch signal. Specifically, as FIG. 1 shows, the switch device 13 not only connects to the controller 3 by the first data port 131 and connects to the signal repeater 11 by the second data port 133, and the switch device 13 further connects to the memory 2 by a third data port 135. In this embodiment, when the switch device 13 receives the switch signal, not only the data transmission path between the controller 3 and the signal repeater 11 is able to be conducted, but also the data transmission path between the controller 3 and the memory 2 is further conducted. Therefore, the controller 3 is able to reset the parameter data both of the signal repeater 11 and the memory 2 at the same time. Also, in practice, said above data transmission path is able to be an I2C bus (inter-integrated circuit).

In the above embodiment, after the signal repeater 11 determines the internal parameter data completed setting, the signal repeater 11 generates the switch signal. In other embodiments, the signal repeater 11 further comprises control pin 118 for receiving the control signal from the external device, and the signal repeater 11 generates the switch signal for switching the mode from the major mode to the minor mode (or from the minor mode to the major mode) based on the control signal. For instance, said above external device may be an electrical switch and a controller for controlling the electrical switch; also, the external device may be a mechanical switch, and the users is able to use the mechanical switch to trigger the repeater device 1. In other embodiment, the signal repeater 11 further comprises a debug pin 119, and the debug pin 119 connects to an external debug device for performing the debug of the internal parameter data of the signal repeater 11. Additionally, the connection between the debug pin 119 and the external debug device is an I2C bus (inter-integrated circuit). As the description in the above section, the data transmission path may be an I2C bus in one or a plurality of embodiments. Difference from the prior art, the parameter configuration in the prior art is worked with the composition from four input states by the pins. However, through the parameter configuration worked by the data transmission path disposed as the I2C bus, it's able to directly change the parameter in the register of the signal repeater 11, and the composition of the parameter configuration is diversifier than the prior art.

Figure 2:
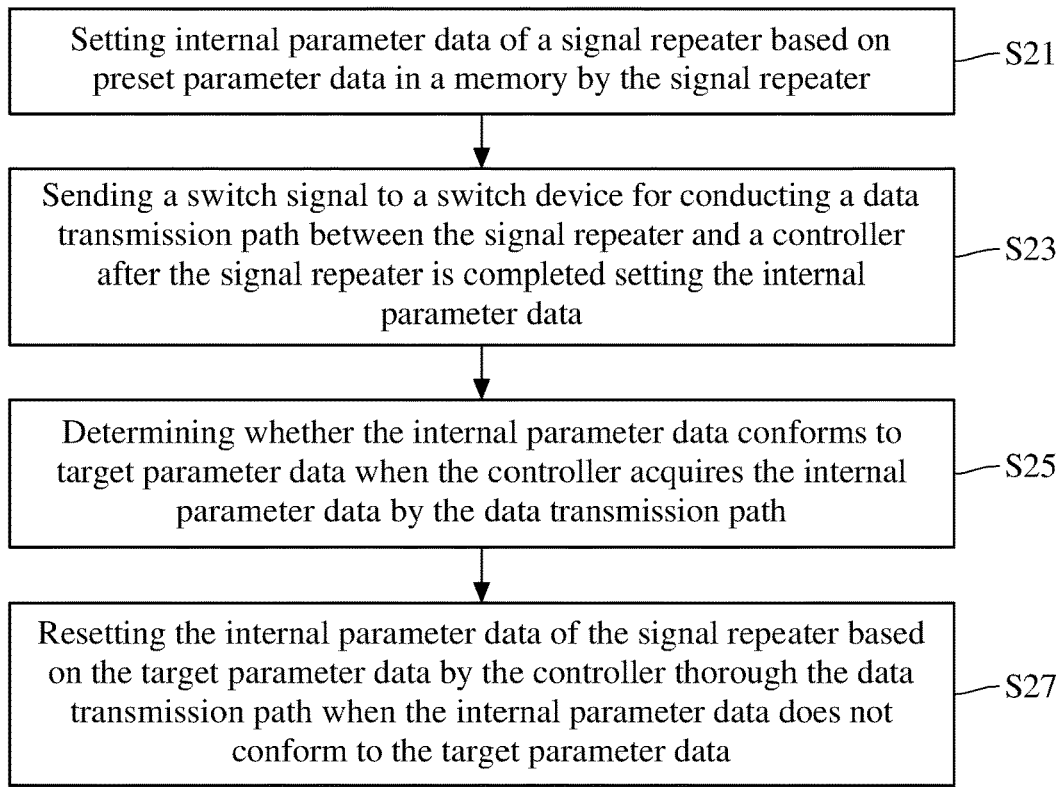
FIG. 2 is the flowchart of the parameter configuration method in an embodiment based on this disclosure.

Please refer to FIG. 1 and FIG. 2 together for illustrating the method of configuring the parameter for the repeater device 1 with a plurality of parameter configuration modes, wherein FIG. 2 is the flowchart of the parameter configuration method in an embodiment based on this disclosure. For the step S21, the signal repeater 11 of the repeater device 1 sets the internal parameter data of the signal repeater 11 based on the preset parameter data in the memory 2. Particularly, the signal repeater 11 is able to set the parameter included by the preset parameter data as the internal parameter data. In other embodiment, the signal repeater 11 is able to do weighting calculation or other kinds of calculation for the parameter included by the preset parameter data, and the signal repeater 11 set said above parameter as the internal parameter data. For a further description, as the repeater device 1 is just turned on, the signal repeater 11 is in the major mode; in other words, the preset state of the switch device 13 is a cut-off state.

For the step S23 and S25, after the signal repeater 11 is completed setting the internal parameter data, the signal repeater 11 sends the switch signal to the switch device 13 for conducting the data transmission path between the signal repeater 11 and the controller 3. The controller 3 acquires the internal parameter data of the signal repeater 11 by said data transmission path, and the controller 3 determines whether the internal parameter data conforms to the target parameter data. Particularly, the controller 3 is able to determine whether the internal parameter data is equaled to the target parameter data. If the internal parameter data doesn't conform to the target parameter data, the controller 3 resets the internal parameter data of the signal repeater 11 based on the target parameter data (as the step S27 described).

In an embodiment, the cable connected to the signal repeater 11 is related to an applicable parameter, and said applicable parameter is the target parameter data mentioned above. When the signal repeater 11 gains the signal received from the cable, said above applicable parameter is currently changed based on the transmitting condition of the cable, and the controller 3 resets the internal parameter data of the signal repeater 11 based on the changed applicable parameter (such as direct replacement, or calculating the applicable parameter and then set it as the internal parameter data). In other words, in this embodiment, the controller 3 is able to currently reset the internal parameter data of the signal repeater 11. Furthermore, the signal sent by said above cable may be the PCIe (peripheral component interconnect express), the serial ATA (serial advanced technology attachment), the SAS (serial attached SCSI) or other communication signal in the universal format. Also, in another embodiment, the target parameter data saved in the controller 3 may be set by the user.

For the further description, when the switch device 13 is conducted, the data transmission path between the controller 3 and the memory 2 (second data transmission path) is conducted. At this moment, the controller 3 is able to perform the parameter configuration in said above steps S25 to S27 to the memory 2, so the controller 3 is able to reset the preset parameter data saved in the memory 2. Hence, as the repeater device 1 is turned on again, the signal repeater 11 is able to acquire the present preset parameter data saved in the memory 2.

Through the above structures, the repeater device with a plurality of parameter configuration modes and the parameter configuration method is disclosed in this disclosure, the signal repeater is switched between a major mode and a minor mode by controlling the switch device to a cut-off state or a conducted state. In the major mode, the signal repeater is able to acquire the parameter data in the memory for performing the parameter configuration, and simplifies the signal transmitting process set by the external controller or the user. In the minor state, the controller is able to currently reset the internal parameter data of the signal repeater without reboot and power outage, and makes the process of improving the operating system be more convenient. Additionally, it's able to conform the parameter configuration when the signal repeater is switched from major mode to minor mode. As a result, the repeater device with a plurality of parameter configuration modes and the parameter configuration method disclosed in this disclosure is able to improve the reliability of the parameter configuration.

The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A repeater device with a plurality of parameter configuration modes for connecting a memory and a controller, comprising:
   a signal repeater configured to connect to the memory and the controller respectively, with the signal repeater adapted to acquire preset parameter data from the memory for setting internal parameter data, and generating a switch signal after a setting of the internal parameter data is completed; and
   a switch device electrically connected to the signal repeater, wherein the switch device is adapted to conduct a data transmission path between the signal repeater and the controller based on the switch signal; wherein the signal repeater resets the internal parameter data when the signal repeater receives target parameter data by the data transmission path between the signal repeater and the controller.

2. The repeater device according to claim 1, wherein the switch device is further configured to send the target parameter data of the controller to the memory based on the switch signal.

3. The repeater device according to claim 1, wherein the signal repeater comprises a control pin, and the signal repeater generates the switch signal when the signal repeater receives a control signal by the control pin.

4. The repeater device according to claim 1, wherein the signal repeater comprises a debug pin connected to a debug device, and the signal repeater performs the debug of the internal parameter data when the internal parameter data is sent to the debug device by the debug pin.

5. The repeater device according to claim 1, wherein the signal repeater is configured to connect to the memory and the controller respectively by an inter integrated circuit bus.

6. A parameter configuration method, comprising:
   setting internal parameter data of a signal repeater based on preset parameter data in a memory by the signal repeater;
   sending a switch signal to a switch device for conducting a data transmission path between the signal repeater and a controller after the signal repeater is completed setting the internal parameter data;
   determining whether the internal parameter data conforms to target parameter data when the controller acquires the internal parameter data by the data transmission path; and
   resetting the internal parameter data of the signal repeater based on the target parameter data by the controller thorough the data transmission path when the internal parameter data does not conform to the target parameter data.

7. The parameter configuration method according to claim 6 further resetting the preset parameter data in the memory based on the target parameter data via a second data transmission path by the controller when the internal parameter data does not conform to the target parameter data, wherein the switch signal further makes the switch device conduct the second data transmission path between the memory and the controller.

8. The parameter configuration method according to claim 6 further sending a state signal to the controller after setting the internal parameter data of the signal repeater is completed, and determining whether the internal parameter data conforms to the target parameter data when the controller acquires the internal parameter data by the data transmission path is performed based on the state signal.

9. The parameter configuration method according to claim 6, further comprising receiving a control signal by a control pin of the signal repeater for generating the switch signal.

10. The parameter configuration method according to claim 6, further comprising performing the debug of the internal parameter data by a debug pin of the signal repeater.

* * * * *